US012651869B2

(12) United States Patent
Wang et al.

(10) Patent No.: US 12,651,869 B2
(45) Date of Patent: Jun. 9, 2026

(54) CONNECTOR OUTER HOUSING

(71) Applicant: Phoenix Contact Asia-Pacific (Nanjing) CO., LTD., Nanjing (CN)

(72) Inventors: Rui Wang, Nanjing (CN); Min Che, Nanjing (CN); Lili Wang, Nanjing (CN)

(73) Assignee: Phoenix Contact Asia-Pacific (Nanjing) Co., Ltd., Nanjing (CN)

( * ) Notice: Subject to any disclaimer, the term of this patent is extended or adjusted under 35 U.S.C. 154(b) by 330 days.

(21) Appl. No.: 18/562,213

(22) PCT Filed: Apr. 2, 2022

(86) PCT No.: PCT/CN2022/085109
§ 371 (c)(1),
(2) Date: Nov. 17, 2023

(87) PCT Pub. No.: WO2022/242341
PCT Pub. Date: Nov. 24, 2022

(65) Prior Publication Data

US 2024/0258745 A1 Aug. 1, 2024

(30) Foreign Application Priority Data

May 18, 2021 (CN) ......................... 202110541267.1
May 18, 2021 (CN) ......................... 202121073283.4

(51) Int. Cl.
*H01R 13/639* (2006.01)
*H01R 13/426* (2006.01)
(Continued)

(52) U.S. Cl.
CPC ......... *H01R 13/639* (2013.01); *H01R 13/426* (2013.01); *H01R 13/4362* (2013.01); *H01R 13/502* (2013.01); *H01R 13/6272* (2013.01)

(58) Field of Classification Search
CPC ......................... H01R 13/426; H01R 13/4362; H01R 13/502; H01R 13/6272; H01R 13/6335; H01R 13/641
See application file for complete search history.

(56) References Cited

U.S. PATENT DOCUMENTS

2016/0248198 A1* 8/2016 Endo .................. H01R 13/6272
2024/0258745 A1* 8/2024 Wang .................. H01R 13/502

FOREIGN PATENT DOCUMENTS

CN 204793426 U 11/2015
CN 111224263 A 6/2020
(Continued)

OTHER PUBLICATIONS

International Search Report and Written Opinion of International Application No. PCT/CN2022/085109, dated Jun. 15, 2022, 10 Pages.

*Primary Examiner* — Abdullah A Riyami
*Assistant Examiner* — Nader J Alhawamdeh
(74) *Attorney, Agent, or Firm* — The Roy Gross Law Firm, LLC; Roy D. Gross

(57) ABSTRACT

A connector outer housing is provided, which comprises a first opening at a tail end and a second opening at a connection end, the first opening is for wire entrance and the second opening is to form a connection relationship with a mating connector outer housing, wherein a elastic lock arm is provided on an operating surface of the connector outer housing and comprises a locking segment proximate to the connection end and an unlocking segment away from the connection end, the elastic lock arm is positioned on the connector outer housing by means of a support structure and can be elastically deformed to raise the locking segment under an external force applied to the unlocking segment,
(Continued)

wherein the support structure is connected to the elastic lock arm through a plurality of connection portions.

19 Claims, 15 Drawing Sheets

(51) Int. Cl.

| | |
|---|---|
| ***H01R 13/436*** | (2006.01) |
| ***H01R 13/502*** | (2006.01) |
| ***H01R 13/627*** | (2006.01) |

(56) References Cited

FOREIGN PATENT DOCUMENTS

| | | | | |
|---|---|---|---|---|
| CN | 213184776 | U | * | 5/2021 |
| CN | 113193412 | A | | 7/2021 |
| JP | 2009283343 | A | | 12/2009 |

* cited by examiner

CONNECTOR OUTER HOUSING

This application is a national stage application under 35 U.S.C. § 371 of International Application No. PCT/CN2022/085109, filed Apr. 2, 2022, which claims priority to Chinese Patent Application No. 202110541267.1, filed May 18, 2021, and Chinese Patent Application No. 202121073283.4, filed May 18, 2021. The entire contents of each of Application Nos. PCT/CN2022/085109, CN 202110541267.1 and CN 202121073283.4 are incorporated herein by reference.

TECHNICAL FIELD

The present disclosure relates to a connector outer housing and, in particular, to an outer housing that may be used for electrical connectors. This outer housing has a latching structure that provides enhanced retention forces when being mated with an outer housing of a mating connector.

BACKGROUND

Electronic connectors are widely used in various industrial products, including vehicles, to establish power connections and signal connections. The electronic connectors usually include a plug connector and a mating connector. The plug connector has a connector outer housing, wherein the outer housing may have an electrical connection terminal structure installed therein, a tail end of the outer housing is to be used for wire entrance, and a connection end of the outer housing is to be used to mate with an outer housing of the mating connector. The mating connector may be a receptacle connector, such as a board-end receptacle connector mounted on a board, or a cable-end receptacle connector mounted at an end of another wire harness.

Generally, the outer housing of the plug connector is provided with a latching structure that is elastically deformable. When the outer housing of the receptacle connector and the outer housing of the plug connector are mated together, the latching structure on the receptacle connector and the corresponding structure on the receptacle connector can form a physical interference, thereby locking the plug connector and the receptacle connector together. When it is necessary to release the locking, by operations such as pressing and others, the latching structure is elastically deformed to a certain extent so as to release the physical interference.

FIG. 4A illustrates a technically feasible outer housing of a plug connector, which has a latching structure 500 that is elastically deformable. FIG. 4B illustrates another technically feasible outer housing of a plug connector, which has another form of latching structure 600 that is elastically deformable. Either the latching structure 500, or the latching structure 600, will eventually deform under a sufficiently large pulling force and cause the latching between the plug connector and the receptacle connector to be released. The maximum pull-out force that a connector can withstand before it is unlocked can be characterized as a retaining force.

It can be understood that miniaturized connectors are more likely to face challenges in the retaining force, so a connector outer housing design with enhanced retaining force is desired to address such challenges. In addition, secondary lock accessory can be used to enhance the retaining force of the connector, but in some cases, it is desirable to reduce the use of secondary lock accessory and rely solely on a primary lock to provide sufficient retaining force.

SUMMARY

The present disclosure intends to provide a novel connector outer housing with a novel latching structure, which is capable of achieving a higher retaining force as compared to existing designs.

According to an aspect of the present disclosure, a connector outer housing is provided, which comprises a first opening at a tail end and a second opening at a connection end, the first opening being used for accepting wires and the second opening being used to form a connection relationship with a mating connector outer housing, wherein a elastic lock arm is provided on an operating surface of the outer housing and comprises a locking segment proximate to the connection end and an unlocking segment away from the connection end, the elastic lock arm is positioned on the outer housing by means of a support structure and can be elastically deformed to raise the locking segment under an external force applied to the unlocking segment, wherein the support structure forms a connection with the elastic lock arm through a plurality of connection portions.

In aforementioned connector outer housing, the support structure includes a plurality of legs at an end connected to the elastic lock arm, wherein each leg is connected to the elastic lock arm.

In aforementioned connector outer housing, the plurality of legs comprises a first leg and a second leg, wherein the first leg and the second leg extend at different angles and being connected to the elastic lock arm.

In aforementioned connector outer housing, a longitudinal section of the support structure comprises a main arcuate segment, wherein one end of the main arcuate segment is connected to the operating surface and the other end forms a first leg, the longitudinal section of the support structure further comprises a second leg bifurcating from the main arcuate segment, the first leg and the second leg are connected to the elastic lock arm respectively.

In aforementioned connector outer housing, the second leg bifurcates from the inner side of the main arcuate segment.

In aforementioned connector outer housing, the end of a locking arm of the elastic lock arm is provided with a latching nose structure that is to mate with a corresponding latching structure on an outer housing of a mating connector to achieve locking.

In aforementioned connector outer housing, the corresponding latching structure on the outer housing of the mating connector is a hook boss structure.

In aforementioned connector outer housing, the locking between the latching nose structure and the hook boss structure may be released by an external force applied to the unlocking arm.

In aforementioned connector outer housing, the connector outer housing further comprises a detachable secondary lock, wherein the secondary lock is capable of being mounted on an operating surface of the plug outer housing and sliding between a pre-lock position and a final lock position.

In aforementioned connector outer housing, when the secondary lock slides to the final lock position, the secondary lock is located below an unlocking arm of the elastic lock arm, thereby interfering with the travel of motion of the unlocking arm being pressed downwardly.

In aforementioned connector outer housing, a positioning protrusion is provided at the bottom of the secondary lock, a secondary lock mating mounting structure is provided on an operating surface of the plug outer housing, wherein the secondary lock mating mounting structure comprises one or more locking grooves, each locking groove is provided with a pre-locking notch and a final locking notch, and the secondary lock may be positioned in either the pre-locking notch or the final locking notch and may slide between the pre-locking notch and the final locking notch by overcoming resistance.

In aforementioned connector outer housing, the secondary lock mating mounting structure further comprises a exit-preventing groove, and the secondary lock is further provided with a exit-preventing protrusion at its bottom, wherein the exit-preventing protrusion is capable of being positioned in the exit-preventing groove to restrict the secondary lock from sliding out.

In aforementioned connector outer housing, the operating surface of the plug outer housing is provided with sidewalls on both sides, with a position-limiting guide protrusion on each sidewall, and slide-rail protrusions are provided on both ends of the secondary lock, wherein the position-limiting guide protrusions on the sidewalls and the operating surface together define slide grooves mating with the slide-rail protrusions of the secondary lock.

In aforementioned connector outer housing, a pair of position-limiting blocks are provided above the unlocking arm of the elastic lock arm for limiting the space for upward deformation of the elastic lock arm.

In aforementioned connector outer housing, the operating surface of the connector outer housing corresponds to an acting surface of an unlocking operation action.

According to an aspect of the present disclosure, an electrical connector is provided, which comprises the connector outer housing described above.

In aforementioned electrical connector, the connector outer housing is a plug connector outer housing or a receptacle connector outer housing.

In aforementioned electrical connector, the connector outer housing is a cable-end connector outer housing or a board-end connector outer housing.

According to an aspect of the present disclosure, an electrical connection assembly is provided, which comprises a first connector and a mating second connector, wherein the first connector comprises the connector outer housing as described above.

The present disclosure achieves the following beneficial effects: 1. the elastic lock arm, which acts as primary locking device, has a support structure with special design to enable the connector outer housing to provide a good retaining force without the use of a secondary lock; 2. optional secondary lock can further enhance the retaining force.

BRIEF DESCRIPTION OF THE DRAWINGS

The accompanying drawings are not intended to be to scale. In the accompanying drawings, each identical or nearly identical component shown in the individual drawings may be indicated by the same labeling. For clarity, not every component is labeled in each figure. Examples of various aspects of the present disclosure will now be described by way of example and with reference to the accompanying drawings.

SOME REFERENCE NUMBERS

100 plug connector; 120 operating surface; 125 secondary lock mating mounting structure; 130 locking groove; 131 pre-locking notch; 132 final locking notch; 180 position-limiting block; 200 receptacle connector; 220 hook boss structure; 300 secondary lock; 310 base plate; 320 sidewall; 330 slope surface; 340 slide-rail protrusion; 350 positioning protrusion; 390 exit-preventing protrusion; 395 exit-preventing groove; 400 elastic lock arm; 410 locking segment; 415 latching nose; 420 unlocking segment; 440 support structure; 440A first leg; 440B second leg; 460 locking interference; 500 latching structure; 600 latching structure; 700 latching structure.

DETAILED DESCRIPTION

In the following description, the disclosure is described with reference to various examples. However, those skilled in the art will recognize that various examples may be implemented without one or more specific details or with other alternative and/or additional methods, materials, or components. In other instances, well-known structures, materials, or operations are not shown or described in detail so as not to obscure aspects of various examples of the present disclosure. Similarly, specific quantities, materials, and configurations are set forth for explanatory purposes to provide a full understanding of examples of the present disclosure. However, the disclosure may be implemented without these specific details. In addition, it should be understood that various examples illustrated in the accompanying drawings are illustrative representations and are not necessarily drawn to scale.

Figure 1A:
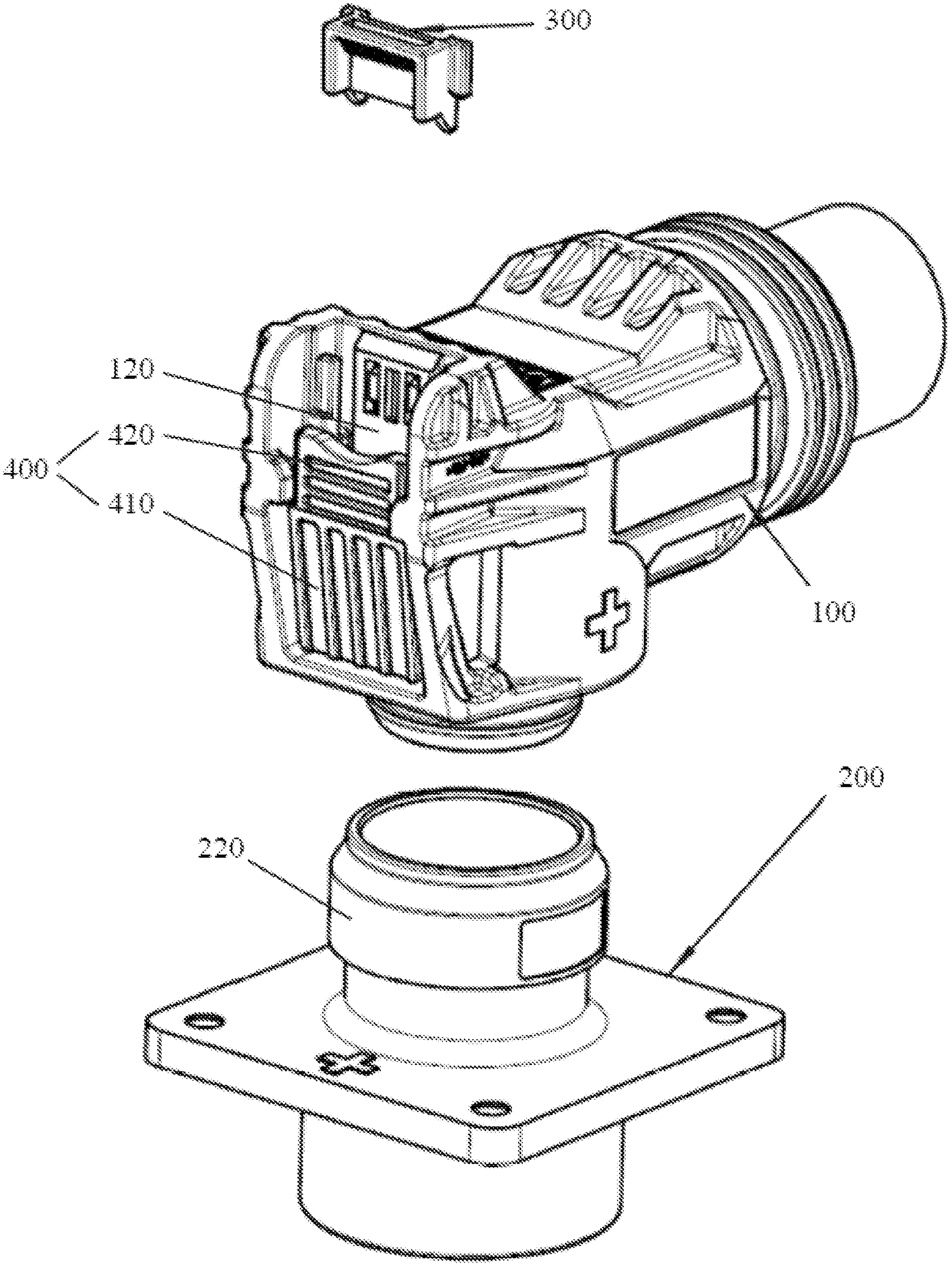
FIG. 1A illustrates an exploded schematic diagram of an electrical connection assembly according to an example of the present disclosure.
Figure 1B:
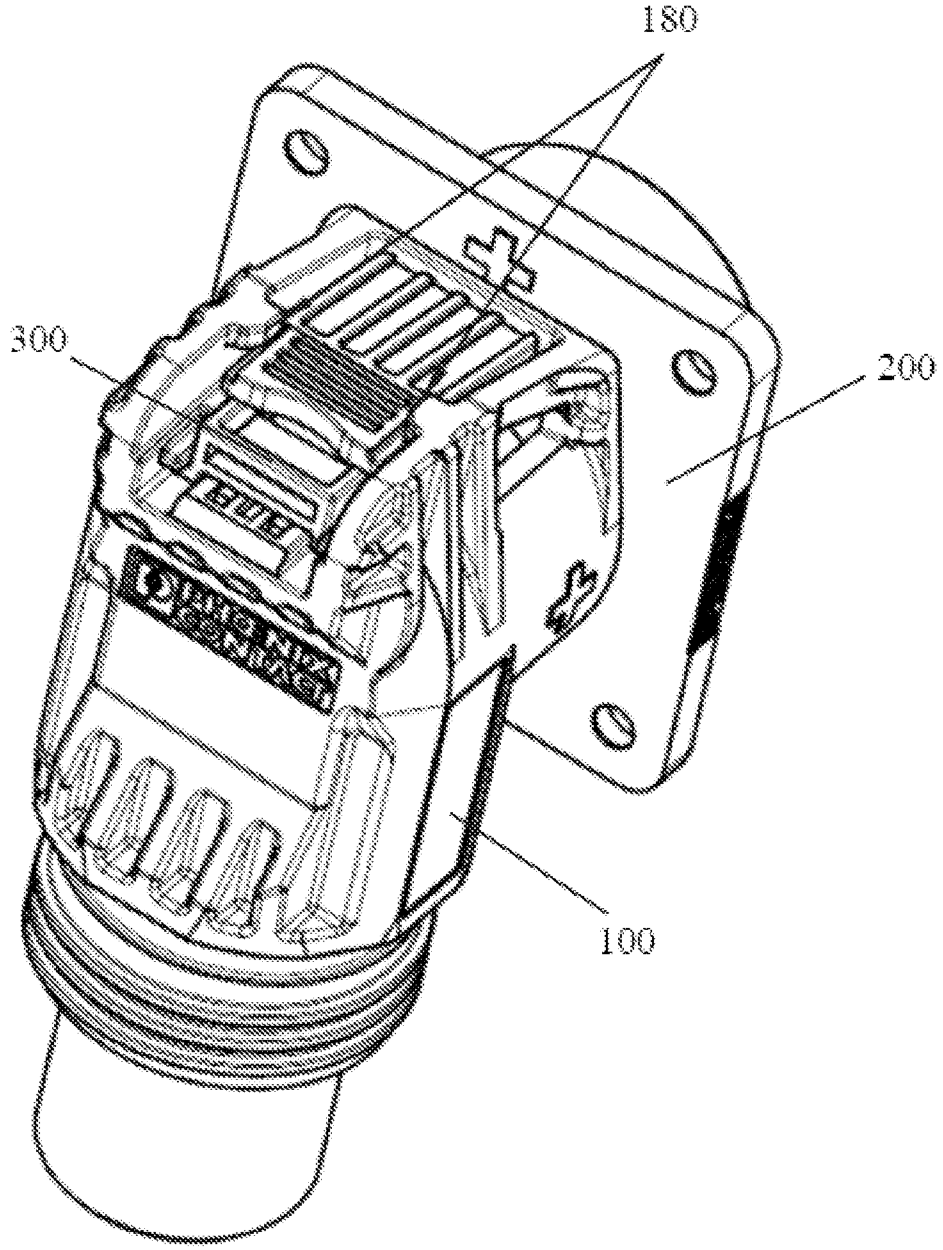
FIG. 1B illustrates a schematic diagram of the electrical connection assembly shown in FIG. 1A in assembled state.

FIG. 1A illustrates an exploded schematic diagram of an electrical connection assembly according to an example of the present disclosure. FIG. 1B illustrates a schematic diagram of the electrical connection assembly shown in FIG. 1A in assembled state. The electrical connection assembly shown in FIG. 1A includes a plug connector 100 and a receptacle connector 200. One surface of the outer housing of the plug connector 100 is provided with an elastic lock arm 400, which serves as a primary locking structure for locking the plug connector 100 and the receptacle connector 200 to each other. An user can unlock the elastic lock arm 400 through a pressing operation on the elastic lock arm 400. In this application, unless otherwise indicated, the surface on the plug connector 100 where the elastic lock arm 400 is located is referred to as an operating surface 120. In some implementations, the electrical connection assembly shown in FIG. 1A may also include a secondary lock 300 as an accessory to the plug connector 100. As shown in FIG. 1B, an outer housing of the plug connector 100 and an outer housing of the receptacle connector 200 may form a mating connection relationship such that insertion terminals (not shown) mounted within the two connectors form an electrical connection relationship. The secondary lock 300 may be assembled to the operating surface 120 of the plug connector 100 and is located underneath the elastic lock arm 400 in a locked state, thereby preventing the elastic lock arm 400 of the plug connector 100 from being pressed and deformed. The secondary lock 300 thus has the effect of enhancing retaining force of the electrical connection assembly.

Figure 2:
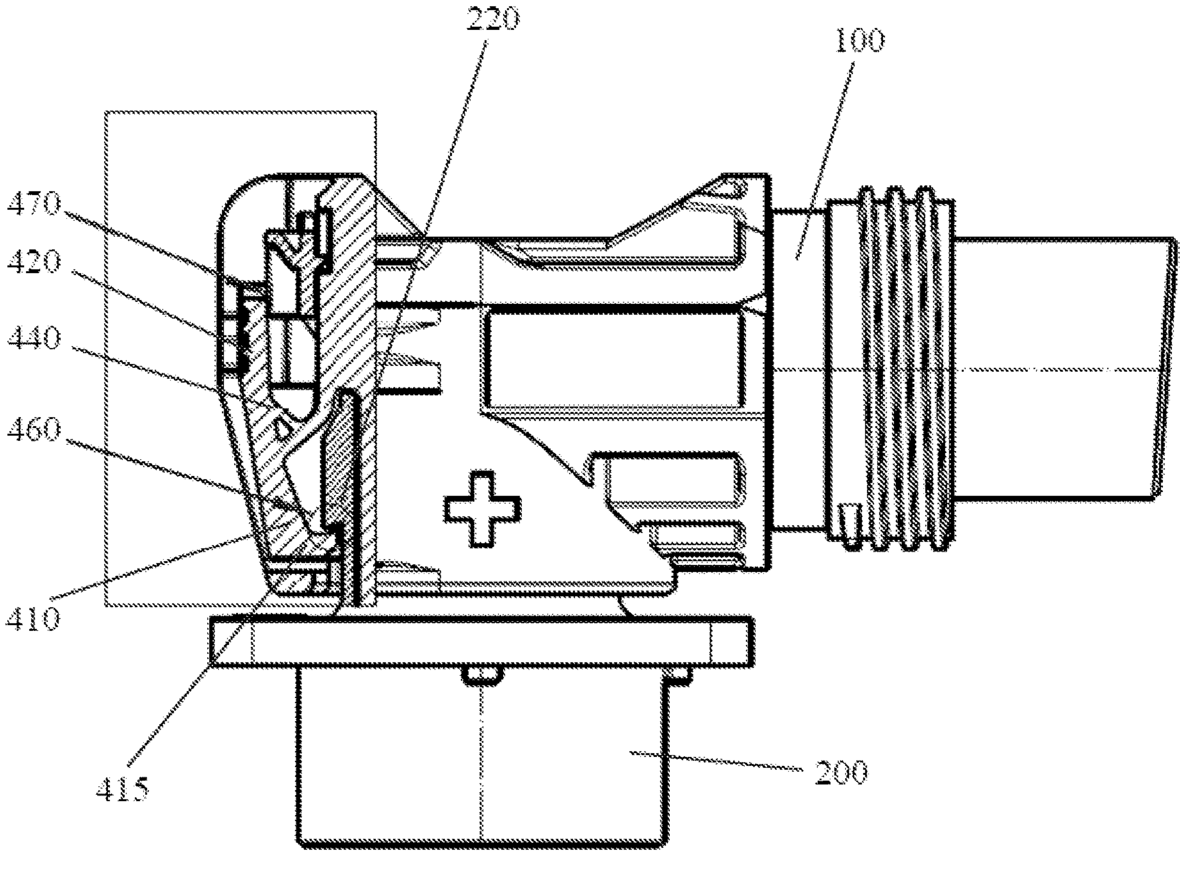
FIG. 2 illustrates a side view and a partial sectional view of a plug connector and a receptacle connector according to an example of the present disclosure in an assembled state.

FIG. 2 illustrates a side view and a partial sectional view of a plug connector 100 and a receptacle connector 200 according to an example of the present disclosure in an assembled state. As shown in FIG. 2, an outer housing of the plug connector 100 in the form of a right-angle connector includes a tail end (right side opening in the figure) for accepting wires, and a connection end (lower side opening in the figure) for mating with the mating connector. The operating surface 120 of the outer housing of the plug connector 100 is provided with an elastic lock arm 400. Observing the elastic lock arm 400 in the partial sectional view given in FIG. 2, the body thereof comprises two portions: a locking segment 410 proximate to the connection end and an unlocking segment 420 away from the connection end, and the body of the elastic lock arm 400 is positioned on the outer housing of the plug connector 100 through a support structure 440. The body of the elastic lock arm 400 and the support structure 440 together form an elastically deformable primary locking structure, which can be elastically deformed by an external force (e.g., a downward pressing force) applied to the unlocking segment 420, causing the locking segment 410 to lift, thereby achieving an effect of unlocking.

Figure 3A:
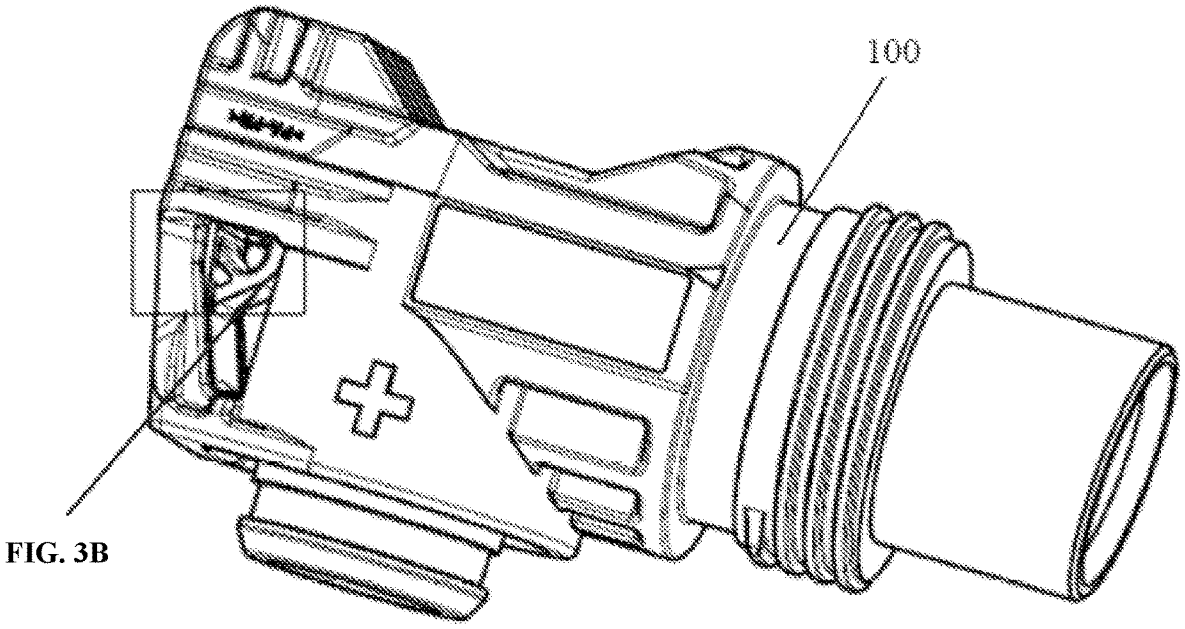
FIG. 3A illustrates a side view of a plug connector according to an example of the present disclosure.
Figure 3B:
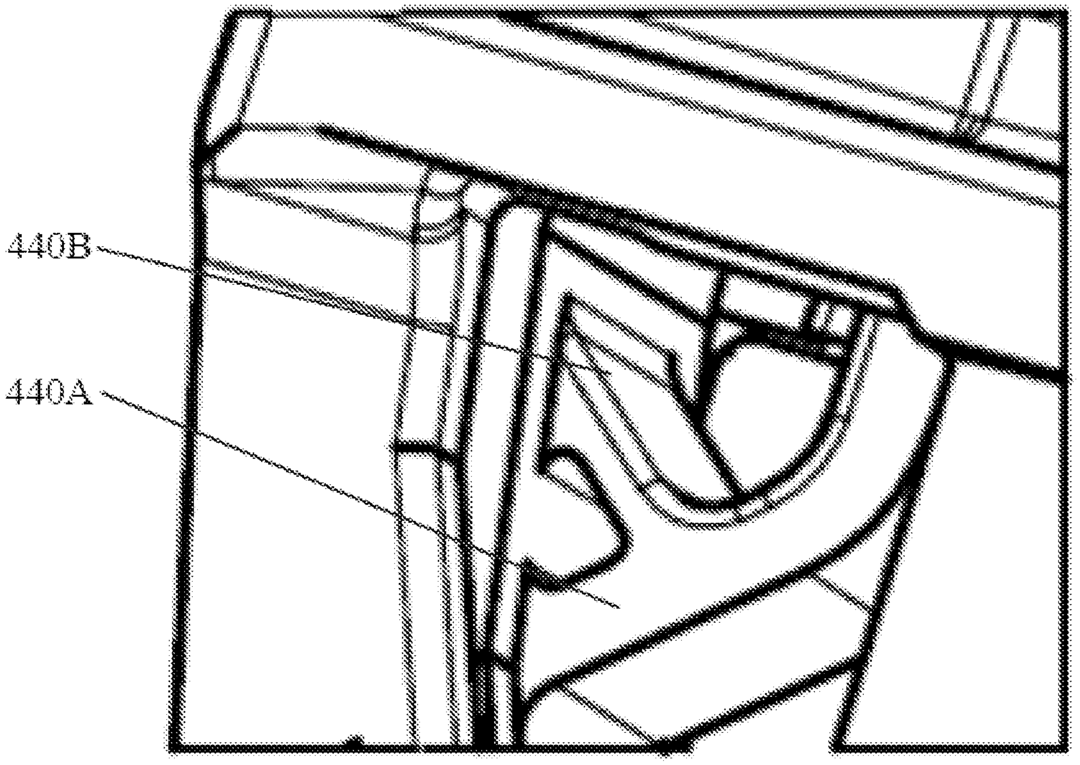
FIG. 3B illustrates a partially enlarged view of a support structure of an elastic lock arm in FIG. 3A.

FIG. 3A illustrates a side view of a plug connector according to an example of the present disclosure, and FIG. 3B illustrates a partially enlarged view of a support structure of the elastic lock arm in FIG. 3A. In conjunction with FIGS. 2 and 3B, it can be seen that the support structure 440 forms a connection with the body of the elastic lock arm 400 through a plurality of connection portions. Specifically, the support structure 440 may include a first leg 440A and a second leg 440B, each of which is connected to the body of the elastic lock arm 400. The first leg 440A and the second leg 440B form a bifurcated support structure, i.e., the two legs extend at different angles and are connected to the elastic lock arm 400. In conjunction with the longitudinal section shown in FIG. 2, the support structure 440 may comprise a main arcuate segment, one end of which is connected to the operating surface 120 and the other end of which constitutes a first leg 440A, and the support structure 440 further comprises a second leg 440B bifurcating from the inner side of the main arcuate segment, with each of the first and second legs 440A and 440B being connected to the body of the elastic lock arm 400.

The numerical range of the angle formed by the first leg 440A and the second leg 440B should not limit the underlying concept of the present disclosure. In some examples, the angle may have a numerical range in the interval of 55°-135°, or more preferably, the angle may have a numerical range in the interval of 70°-120°.

Referring further to FIG. 2, a latching nose structure 415 is provided at the end of the locking segment 410 of the elastic lock arm 400. Without applying a force to the elastic lock arm 400, the latching nose structure 415 is capable of mating with a corresponding latching structure (a locking interference 460 in FIG. 2) on the outer housing of the mating receptacle connector 200 to achieve locking. In FIG. 2, the latching structure on the receptacle connector 200 is shown as a hook boss structure 220. When a pressing force is applied to the unlocking segment 420 of the elastic lock arm 400, the connection portions of the elastic lock arm 400 and the support structure 440 elastically deform, and the locking segment 410 lifts up, thereby releasing the locking between the plug connector 100 and the receptacle connector 200.

Figure 4A:
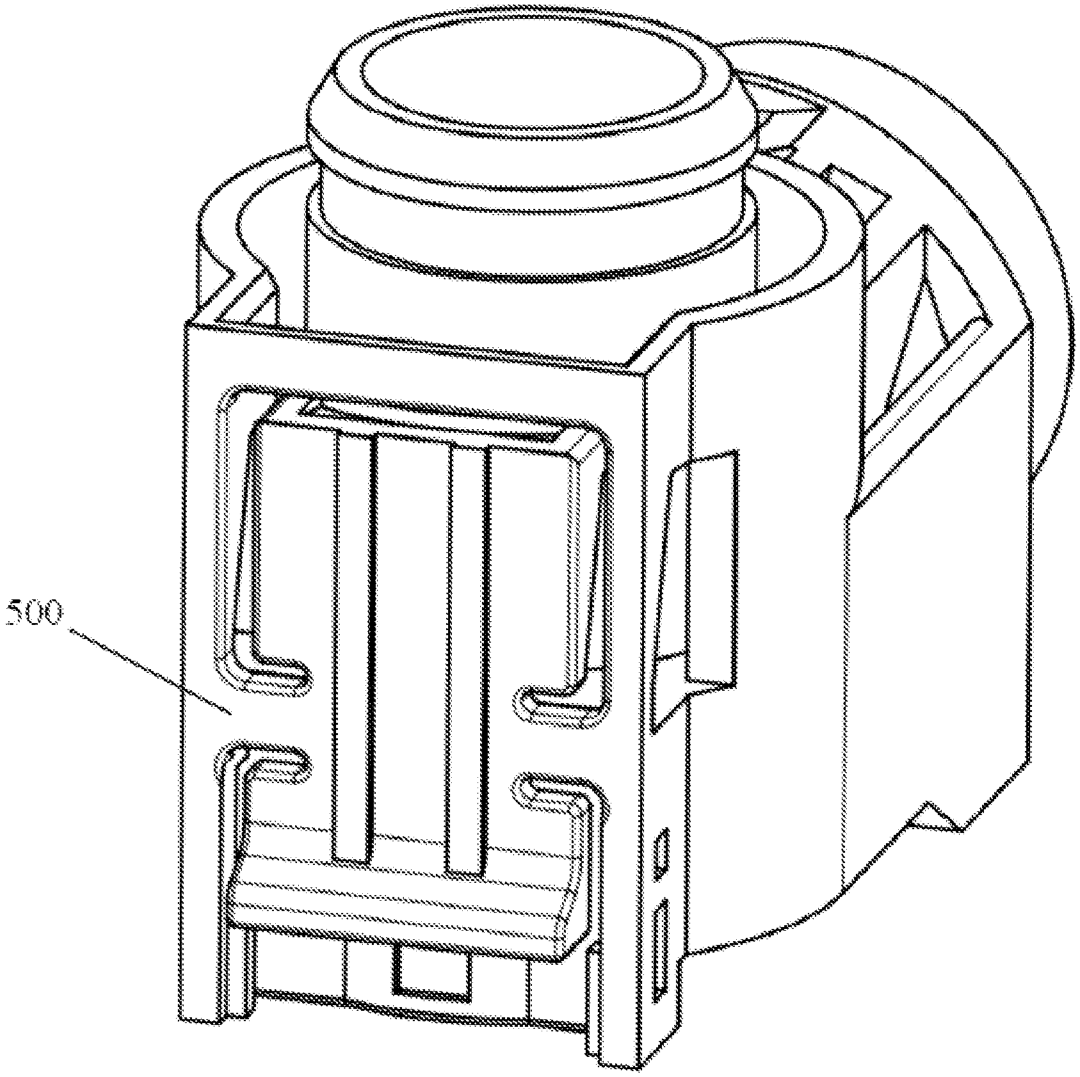
FIG. 4A illustrates an outer housing of a plug connector for comparison with examples of the present disclosure.
Figure 4B:
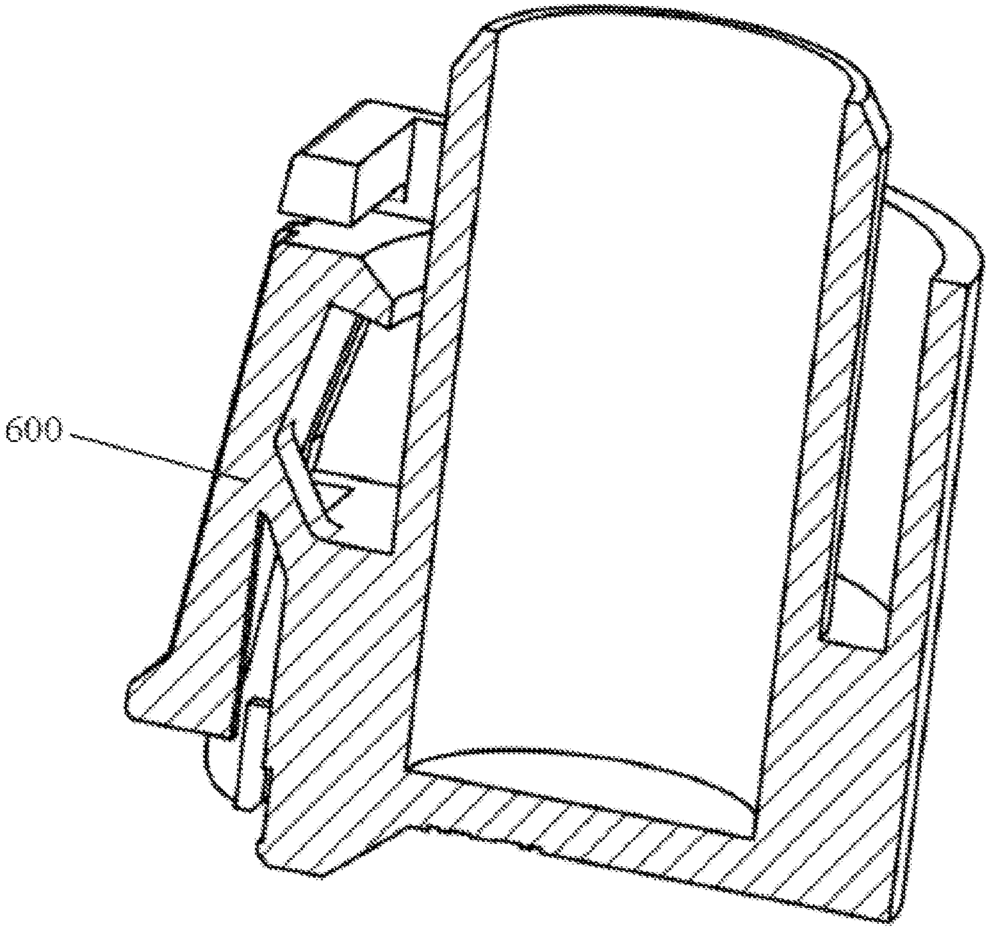
FIG. 4B illustrates an outer housing of a plug connector for comparison with examples of the present disclosure.
Figure 4C:
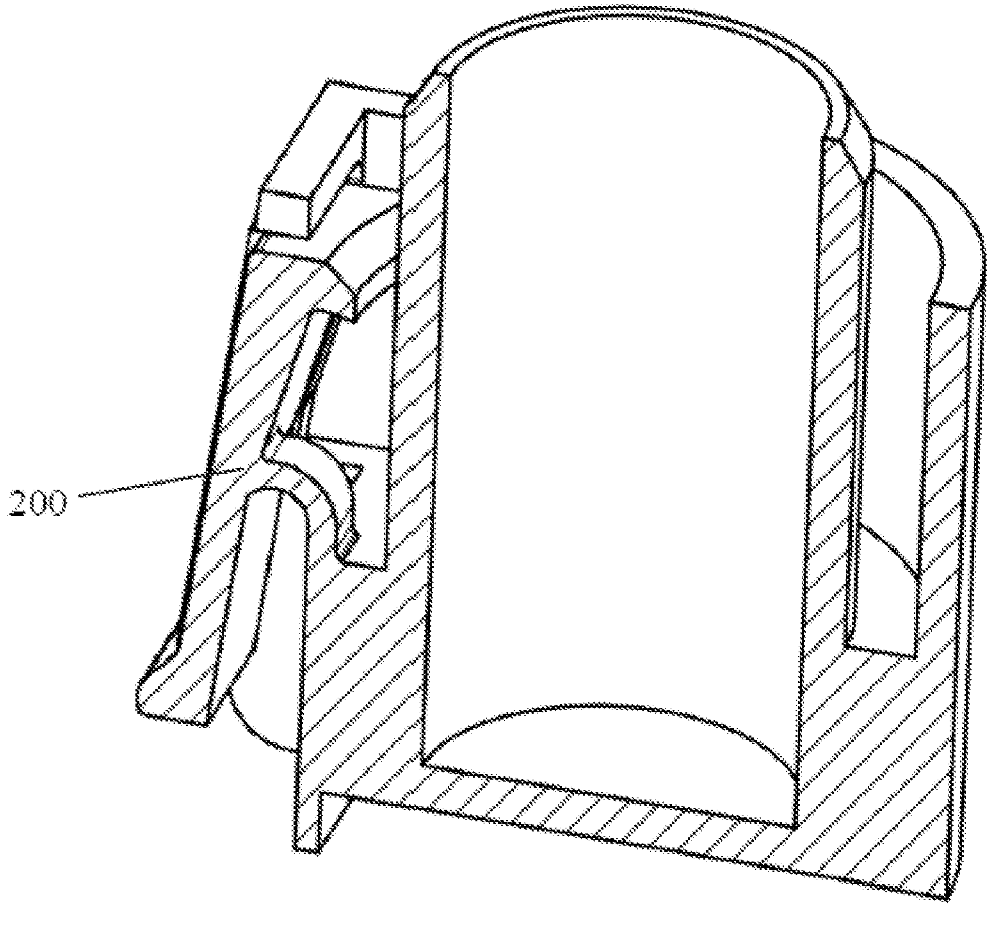
FIG. 4C illustrates an outer housing of a plug connector for comparison with examples of the present disclosure.

The simulation data shows that under substantially identical simulation conditions, the latching structure 500 in the form shown in FIG. 4A can achieve a dry latching retaining force of 69 N, the latching structure 600 in the form shown in FIG. 4B can achieve a dry latching retaining force of 239 N, and the latching structure 700 in the form shown in FIG. 4C can achieve a dry latching retaining force of 230 N and a wet latching retaining force of 133 N. However, the latching structures of examples of the present application shown in FIGS. 2, 3A-3B according to examples of the present application can achieve a dry latching retaining force of more than 300 N and a wet latching retaining force of more than 223 N. The latching structures of examples of the present application can thus provide a good retaining force on a miniaturized connector and, moreover, achieve a more sufficient retaining force without the need for a secondary lock.

Figure 5A:
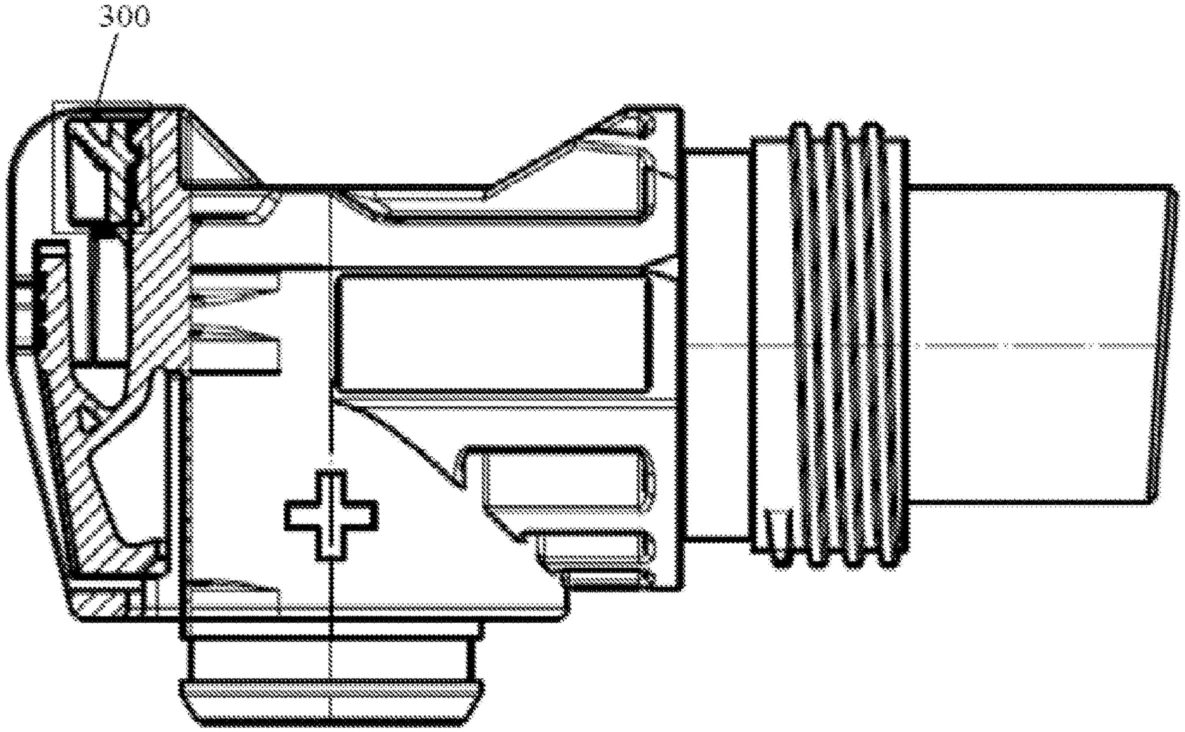
FIG. 5A is a side view illustrating a plug connector according to an example of the present disclosure.
Figure 5B:
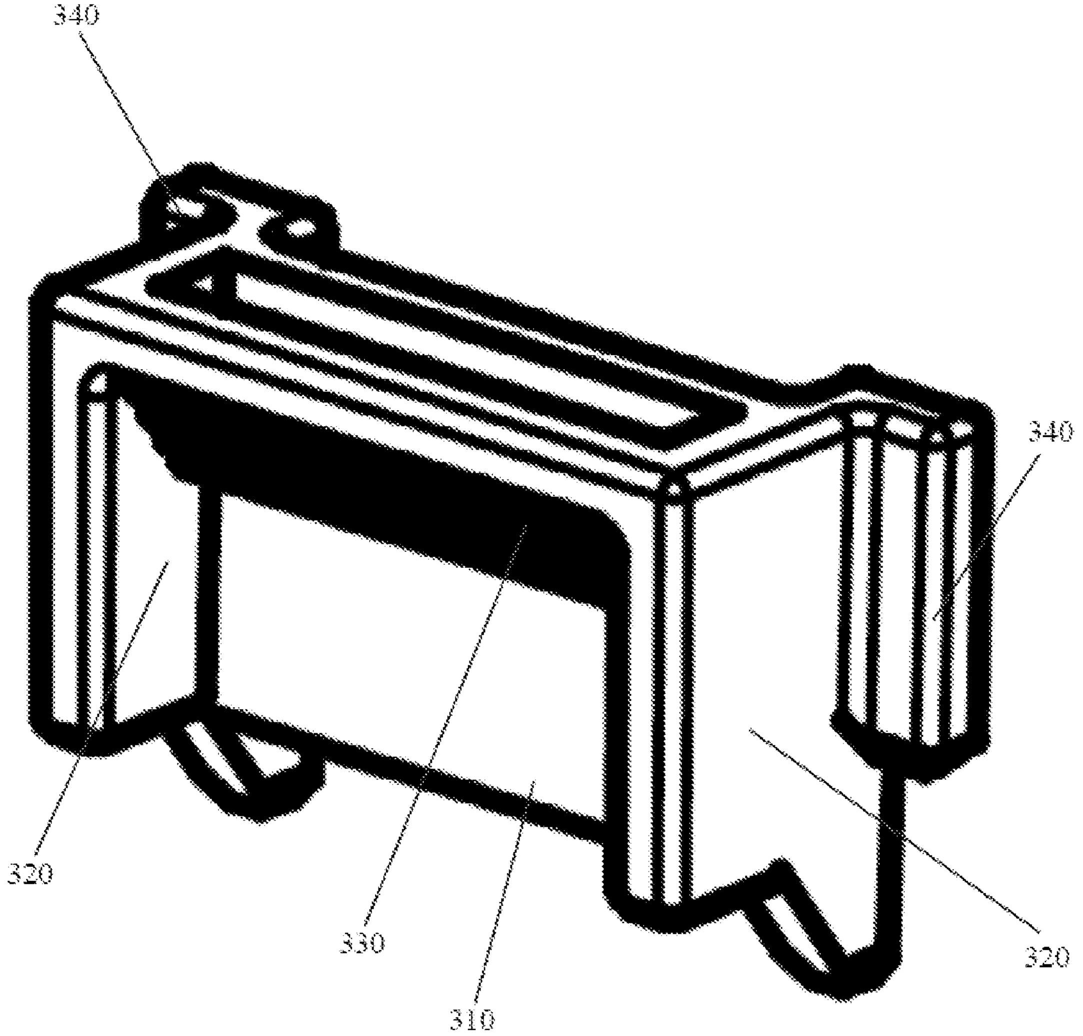
FIG. 5B shows a partially enlarged view of a secondary lock portion in FIG. 5A.
Figure 5C:
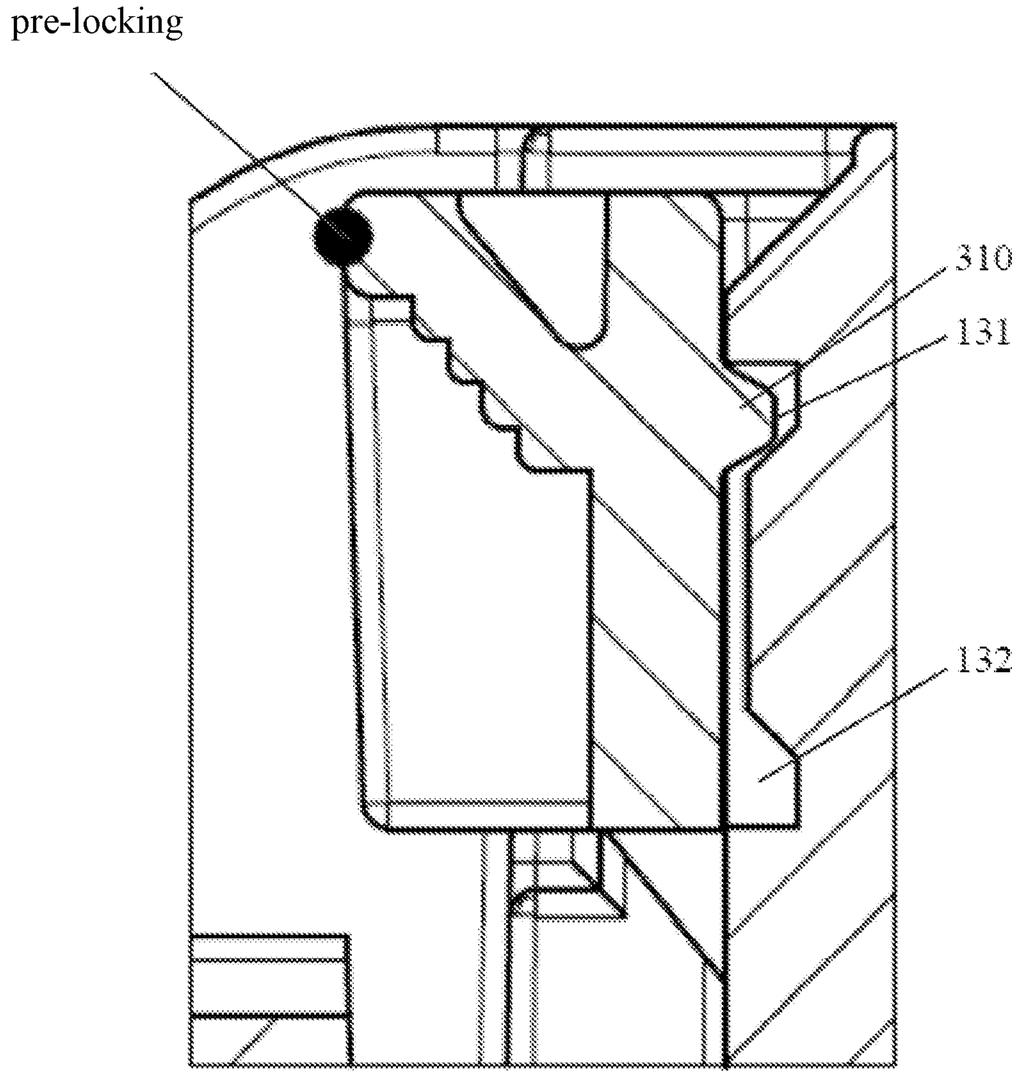
FIG. 5C illustrates a schematic diagram of a secondary lock of FIG. 5B in a pre-locking position.
Figure 5D:
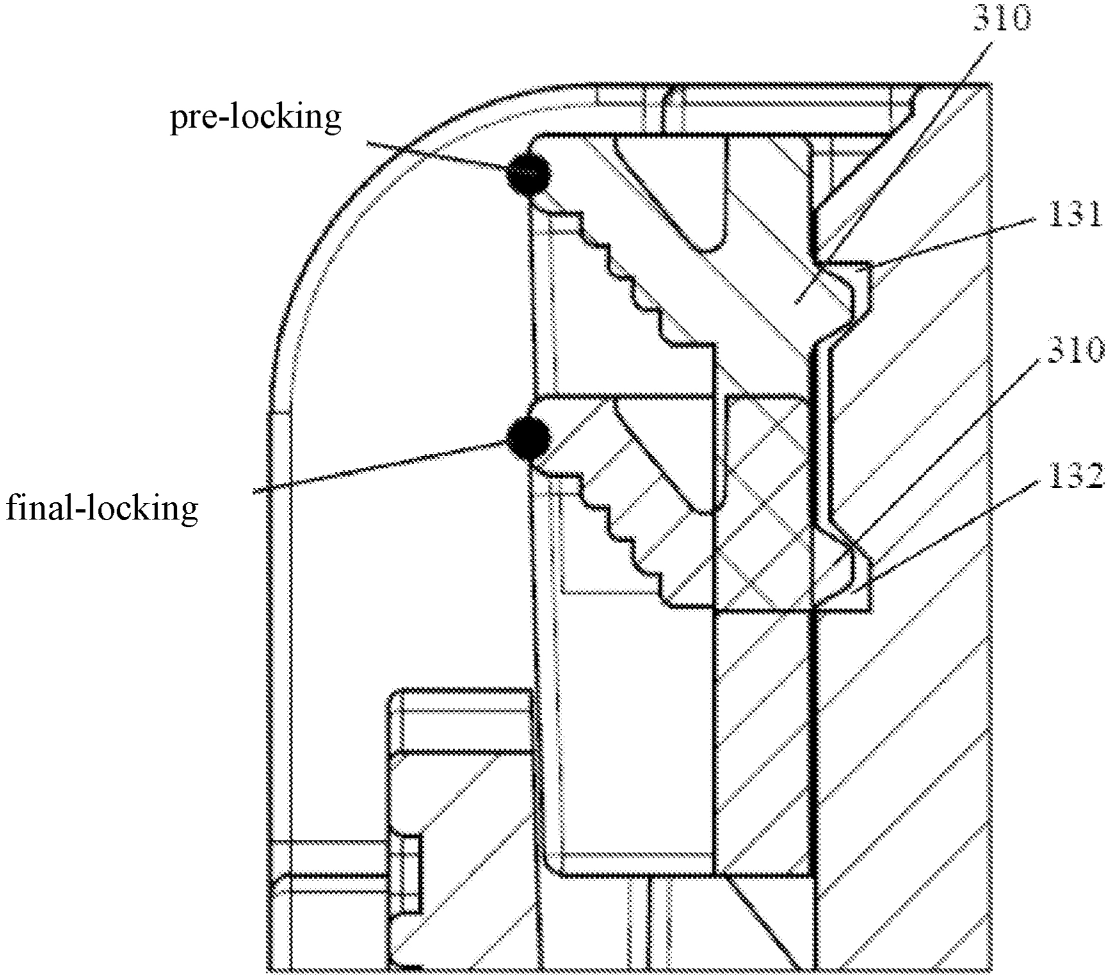
FIG. 5D illustrates a comparative view of the secondary lock of FIG. 5B in both a pre-locking position and a final locking position.
Figure 6A:
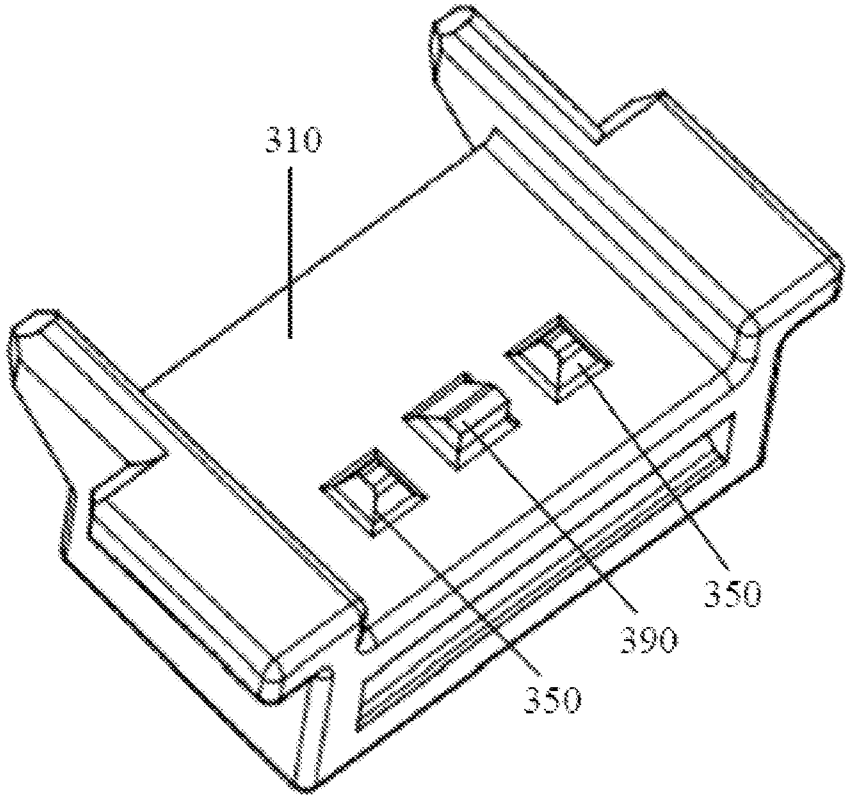
FIG. 6A illustrates a bottom view of a secondary lock according to an example of the present disclosure.
Figure 6B:
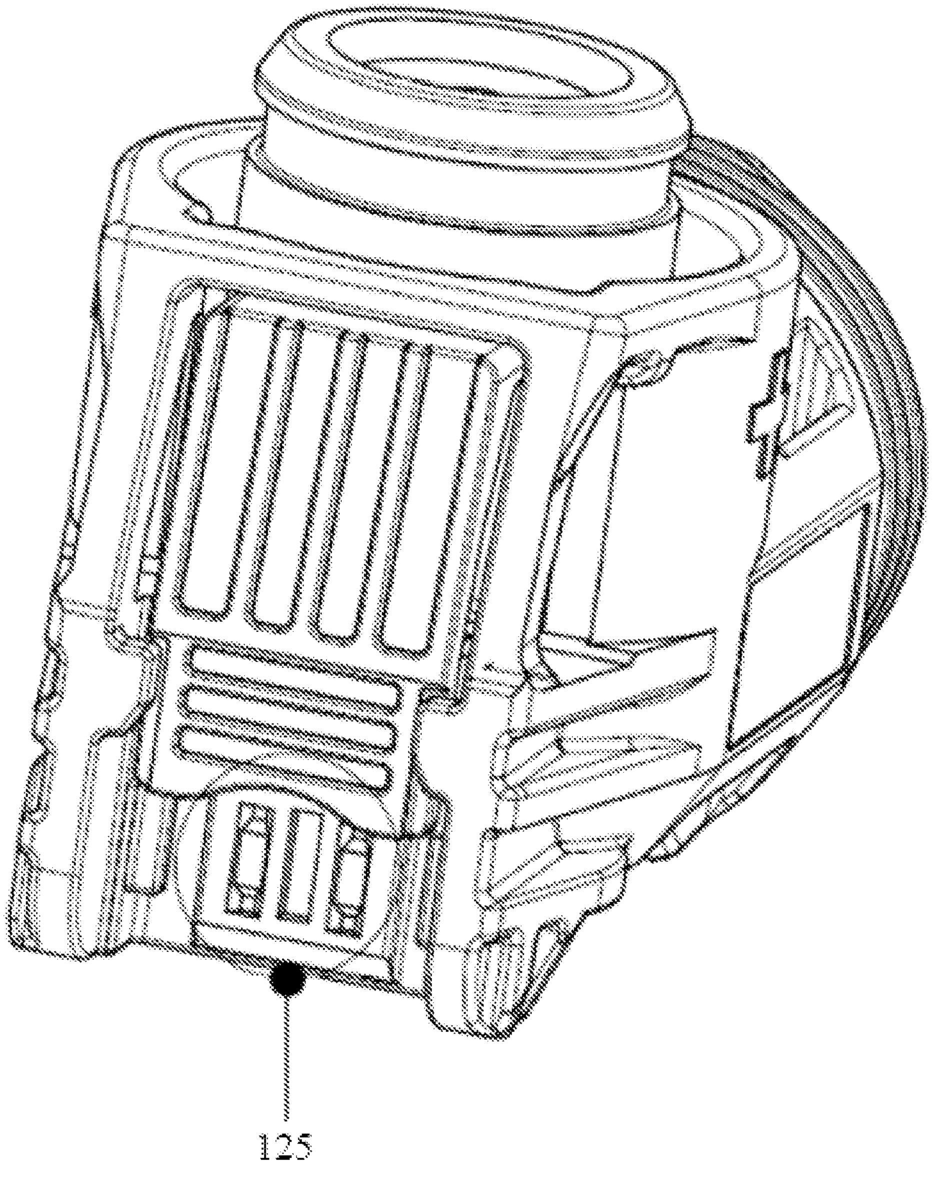
FIG. 6B illustrates a secondary lock mating mounting structure on a plug connector according to an example of the present disclosure.
Figure 6C:
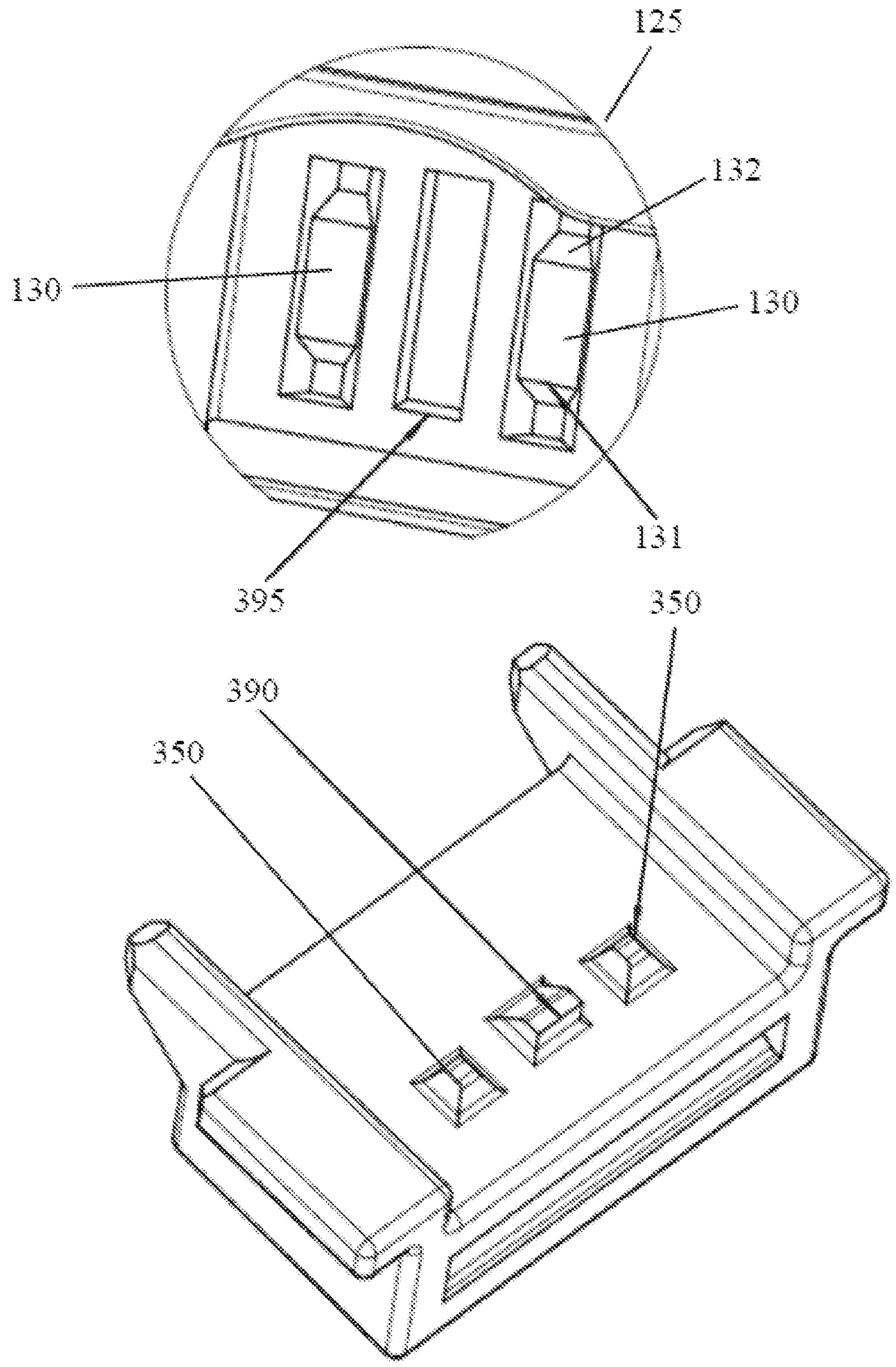
FIG. 6C illustrates the assembly relationship of a secondary lock and a secondary lock mating mounting structure according to an example of the present disclosure.

FIG. 5A is a side view illustrating a plug connector according to an example of the present disclosure, FIG. 5B shows a partially enlarged view of a secondary lock portion in FIG. 5A, FIG. 5C illustrates a schematic diagram of a secondary lock of FIG. 5B in a pre-locking position, and FIG. 5D illustrates a comparative view of the secondary lock of FIG. 5B in both a pre-locking position and a final locking position. FIG. 6A illustrates a bottom view of a secondary lock according to an example of the present disclosure. FIG. 6B illustrates a secondary lock mating mounting structure on a plug connector according to an example of the present disclosure. FIG. 6C illustrates the assembly relationship of a secondary lock and a secondary lock mating mounting structure according to an example of the present disclosure.

Examples relating to the secondary lock are described below in conjunction with FIGS. 5A-5D and FIGS. 6A-6C. It should be understood that the design with respect to the secondary lock does not constitute any limitation on the elastic lock arm as a primary locking device as proposed in this application.

As shown in FIGS. 1A, 1B, and 5A, the secondary lock 300 is a part independent of the outer housing body of the plug connector 100. The shape of the secondary lock 300 is constructed to include a bottom surface 310, sidewalls 320 at each end of the bottom surface 310, a slope surface 330 at the rear end of the bottom surface 310, and slide-rail protrusions 340 at the outer ends of the sidewalls 320. The slide-rail protrusions 340 may take a suitable shape to cooperate with a mounting groove, for example, the slide protrusions 340 are L-shaped in FIG. 5B.

A positioning protrusion structure may be provided on the bottom side of the secondary lock 300. Correspondingly, a secondary lock mating mounting structure 125 may be provided on the operating surface 120 of the plug connector 100. As shown in FIG. 6C, the secondary lock mating mounting structure 125 may include two locking grooves 130, one left and one right, with a pre-locking notch 131 and a final locking notch 132 in each locking groove 130. A positioning protrusion 350 at the bottom of the secondary lock 300 may snap into the pre-locking notch 131 when in the pre-locking position, and may snap into the final locking notch 132 when in the final locking position, and the positioning protrusion 350 may slide between the pre-locking notch 131 and the final locking notch 132 by overcoming a certain amount of resistance. In conjunction with FIGS. 5C and 5D, when the secondary lock 300 is in the pre-locking position, the bottom surface 310 of the secondary lock 300 avoids the unlocking arm 420, and therefore does not physically interfere with the travel of motion of the unlocking arm 420 being pressed. When the secondary lock 300 slides to the final locking position, a base plate 310 of the secondary lock 300 is positioned below the unlocking arm 420 of the elastic lock arm 400, thereby preventing the unlocking arm 420 from being pressed downward sufficiently. The slope surface 330 of the secondary lock 300 may be provided with non-slip prongs to facilitate the user to press the secondary lock 300 with a finger. Although two locking grooves 130 are shown, it will be understood that the locking groove 130 may be a single or more than three, depending on practical needs.

The secondary lock mating mounting structure may also include an exit-preventing groove 395, and an exit-preventing protrusion 390 may be provided at the bottom of the secondary lock 300. When the secondary lock is mounted on the operating surface, the exit-preventing protrusion 390 is positioned in the exit-preventing groove 395 and can slide back and forth, thereby restricting the secondary lock 300 from sliding out.

In further conjunction with FIGS. 1A and 1B, structural features for the installation of the secondary lock 300 are to be illustrated. Sidewalls are provided on each side of the operating surface 120 of the outer housing of the plug connector 100, and a position-limiting guide protrusion 140 is provided on each sidewall. The position-limiting guide protrusions 140 and the operating surface together define slide groove structure for mating with the slide-rail protrusions 340 of the secondary lock 300. After the secondary lock 300 is loaded into the operating surface 120, the base plate 310 thereof is in a secondary lock mounting area 125 and can slide based on the guidance of the slide groove structures, switching position between a first positioning notch 121 and a second positioning notch 122.

Referring further to FIGS. 1A and 1B, a pair of position-limiting blocks 180 may be provided above the unlocking arm of the elastic lock arm 400, thereby limiting the space for upward deformation of the elastic lock arm 400.

In the above examples, the construction of the elastic lock arm in the outer housing of the plug connector 100 is described based on the plug connector 100. However, it will be understood that the elastic lock arm may be constructed on the outer housing of the receptacle connector. It can also be understood that the elastic lock arm may be constructed on any cable-end connector outer housing or board-end connector outer housing. Further, the protection of the present application shall extend to any electrical connector, provided that the outer housing of such electrical connector adopts the construction of the elastic lock arm as a main locking means as proposed in the present application. Further, the protection of the present application shall extend to any electrical connection assembly, provided that the outer housing of the electrical connector in such electrical connection assembly adopts the construction of the elastic lock arm as a main locking means as proposed in the present application.

The basic concepts have been described above, and it will be apparent to those skilled in the art that the foregoing disclosure is intended to be exemplary only and does not constitute a limitation of the present application. Although not expressly stated herein, those skilled in the art may make various modifications, improvements, and amendments to this application. Such modifications, improvements, and amendments are suggested in this application, so such modifications, improvements, and amendments remain within the spirit and scope of the examples of this application.

The primary locking means or primary locking structure referred to in the background and examples of the present application is also referred to in the art as a primary latching or a primary lock. The secondary locking means or secondary latching meaning referred to in the background and examples of the present application is also referred to in the art as a secondary lock, and accordingly, the slider depicted in FIGS. 5A-5D and FIGS. 6A-6C, which is called as a secondary lock, may also be referred to as a secondary locking slider.

The following is a list of additional non-limiting examples that may be based on one or more techniques of the present disclosure.

Example 1. A connector outer housing comprising a first opening and a second opening, the first opening defining a tail end for wire entrance, the second opening defining a connection end for forming a connection wherein the outer housing includes an operating surface proximate to the side where the connection end locates, the operating surface is provided with a primary locking structure (primary lock) comprising a elastic lock arm, the elastic lock arm comprises a locking segment proximate to the connection end and a pressing unlocking segment away from the connection end, the elastic lock arm is positioned on the outer housing by means of a support structure and can be elastically deformed to raise the locking segment under an external force applied to the pressing unlocking segment, by means of the elastic deformation, unlocking of the connector outer housing and a mating connection device is achieved, the support structure comprises, at an end connected to the elastic lock arm, a plurality of legs respectively connected to said elastic lock arm, the plurality of legs comprising at least a first leg and a second leg, the first leg and the second leg extending at different angles and being connected to the elastic lock arm, the first leg and the second leg forming an angle of 55°-135°.

Example 2. The connector outer housing of example 1, wherein a longitudinal section of the support structure comprises a main arcuate segment, wherein one end of the main arcuate segment is connected to the operating surface and the other end forms a first leg, the longitudinal section of the support structure further comprises a second leg bifurcating from the main arcuate segment, the first leg and the second leg are connected to the elastic lock arm respectively.

Example 3. The connector outer housing of example 2, wherein the second leg bifurcates from an inner side of the main arcuate segment.

Example 4. The connector outer housing of example 1, wherein an end of a locking arm of the locking poppet arm is provided with a latching nose structure to mate with a corresponding latching structure on an outer housing of a mating connector to achieve locking.

Example 5. The connector outer housing of example 4, wherein the corresponding latching structure on the outer housing of the mating connector is a hook boss structure, and the locking between the latching nose structure and the hook boss structure may be released by an external force applied to the pressing unlocking arm.

Example 6. The connector outer housing of example 1, wherein the connector outer housing may be mounted with a secondary locking slider, and the first leg and the second leg forms an angle of 70°-120°.

Example 7. A connector outer housing comprising a first opening and a second opening, the first opening defining a tail end for wire entrance, the second opening defining a connection end for forming a connection relationship with a mating connector, wherein the connector outer housing further includes: an operating surface proximate to one side where the connection end locates, wherein the operating surface is provided with an elastic lock arm comprising a locking segment proximate to the connection end and a pressing unlocking segment away from the connection end, the elastic lock arm is positioned on the outer housing by means of a support structure and can be elastically deformed to raise the locking segment under an external force applied to the pressing unlocking segment, by means of the elastic deformation, unlocking of the connector outer housing and a mating connection device is achieved; a secondary locking slider (secondary lock) that is capable of being mounted on the operating surface of the outer housing and sliding between a pre-locking position and a final locking position, wherein when the secondary locking slider slides to the final locking position, the secondary locking slider is located below a pressing unlocking segment of the elastic lock arm, thereby interfering with the travel of motion of the pressing unlocking segment being pressed downwardly.

Example 8. The connector outer housing of example 7, wherein a positioning protrusion is provided at the bottom of the secondary locking slider, a secondary locking slider mating mounting structure is provided on an operating surface of the outer housing, wherein the secondary locking slider mating mounting structure comprises one or more locking grooves, each locking groove is provided with a pre-locking notch and a final locking notch, and the secondary locking slider may be positioned in either the pre-locking notch or the final locking notch and may slide between the pre-locking notch and the final locking notch by overcoming resistance.

Example 9. The connector outer housing of example 7, wherein the secondary locking slider mating mounting structure further comprises an exit-preventing groove, and the secondary locking slider is further provided with an exit-preventing protrusion at its bottom, wherein the exit-preventing protrusion is capable of being positioned in the exit-preventing groove to restrict the secondary locking slider from sliding out; the operating surface of the outer housing is provided with sidewalls on both sides, with a position-limiting guide protrusion on each sidewall, and slide-rail protrusions are provided on both ends of the secondary locking slider, wherein the position-limiting guide protrusions on the sidewalls and the operating surface together define slide grooves mating with the slide-rail protrusions of the secondary locking slider.

Example 10. A plug connector comprising the connector outer housing of any one of examples 1-9.

Example 11. A connector outer housing comprising a first opening at a tail end and a second opening at a connection end, the first opening is for wire entrance and the second opening is to form a connection relationship with a mating connector outer housing, wherein a elastic lock arm is provided on an operating surface of the outer housing and comprises a locking segment proximate to the connection end and an unlocking segment away from the connection end, the elastic lock arm is positioned on the outer housing by means of a support structure and can be elastically deformed to raise the locking segment under an external force applied to the unlocking segment, the support structure includes a plurality of legs at an end connected to the elastic lock arm, each leg is connected to the elastic lock arm, the plurality of legs comprises a first leg and a second leg, the first leg and the second leg extend at different angles and being connected to the elastic lock arm, and the first leg and the second leg form an angle of 55°-135°.

The invention claimed is:

1. A connector outer housing comprising:

a tail end defining a first opening and a connection end defining a second opening, the first opening configured to be used for wire entrance and the second opening configured to form a connection relationship with a mating connector outer housing, wherein:

an elastic lock arm is provided on an operating surface of the outer housing, the elastic lock arm comprises a locking segment proximate to the connection end and an unlocking segment away from the connection end, the elastic lock arm is positioned on the outer housing via a support structure and configured to be elastically deformed to raise the locking segment under an external force applied to the unlocking segment, and wherein the support structure comprises a plurality of legs, and each of the plurality of legs is connected to the elastic lock arm respectively.

2. The connector outer housing according to claim 1, wherein the plurality of legs are located at an end connected to the elastic lock arm.

3. The connector outer housing according to claim 1, wherein the plurality of legs comprise a first leg and a second leg, and wherein the first leg and the second leg extend at different angles and being connected to the elastic lock arm.

4. The connector outer housing according to claim 1, wherein a longitudinal section of the support structure comprises a main arcuate segment, a first end of the main arcuate segment is connected to the operating surface and a second end of the main arcuate segment forms a first leg, the longitudinal section of the support structure further comprises a second leg bifurcating from the main arcuate segment, and the first leg and the second leg are connected to the elastic lock arm respectively.

5. The connector outer housing according to claim 4, wherein the second leg bifurcates from an inner side of the main arcuate segment.

6. The connector outer housing according to claim 1, wherein an end of a locking arm of the elastic lock arm is provided with a latching nose structure that is configured to mate with a corresponding latching structure on an outer housing of a mating connector to achieve locking.

7. The connector outer housing according to claim 6, wherein the corresponding latching structure on the outer housing of the mating connector is a hook boss structure.

8. The connector outer housing according to claim 7, wherein the locking between the latching nose structure and the hook boss structure is configured to be released by an external force applied to the unlocking arm.

9. The connector outer housing according to claim 1, further comprising a detachable secondary lock, wherein the detachable secondary lock is configured to be mounted on an operating surface of a plug outer housing and configured to slide between a pre-lock position and a final lock position.

10. The connector outer housing according to claim 9, wherein when the secondary lock is configured to slide to the final lock position, and wherein the secondary lock is located below an unlocking arm of the elastic lock arm, thereby interfering with travel of motion of the unlocking arm being pressed downwardly.

11. The connector outer housing according to claim 9, wherein a positioning protrusion is provided at a bottom of the secondary lock, wherein a secondary lock mating mounting structure is provided on the operating surface of the plug outer housing, wherein the secondary lock mating mounting structure comprises one or more locking grooves, each locking groove is provided with a pre-locking notch and a final locking notch, and wherein the secondary lock is configured to be positioned in either the pre-locking notch or the final locking notch and configured to slide between the pre-locking notch and the final locking notch by overcoming resistance.

12. The connector outer housing according to claim 9, wherein the secondary lock mating mounting structure further comprises an exit-preventing groove, wherein the secondary lock is further provided with an exit-preventing protrusion at its bottom, and wherein the exit-preventing protrusion is configured to be positioned in the exit-preventing groove to restrict the secondary lock from sliding out.

13. The connector outer housing according to claim 9, wherein the operating surface of the plug outer housing is provided with sidewalls on both sides, with a position-limiting guide protrusion on each sidewall, wherein slide-rail protrusions are provided on both ends of the secondary lock, and wherein the position-limiting guide protrusions on the sidewalls and the operating surface together define slide grooves mating with the slide-rail protrusions of the secondary lock.

14. The connector outer housing according to claim 1, wherein a pair of position-limiting blocks are provided above an unlocking arm of the elastic lock arm and configured to limit a space for upward deformation of the elastic lock arm.

15. The connector outer housing according to claim 1, wherein the operating surface of the connector outer housing corresponds to an acting surface of an unlocking operation action.

16. An electrical connector comprising a connector outer housing and electrical connection terminal mounted therein, the connector housing comprising:

a tail end defining a first opening and a connection end defining a second opening, the first opening configured to be used for wire entrance and the second opening configured to form a connection relationship with a mating connector outer housing, wherein an elastic lock arm is provided on an operating surface of the outer housing, the elastic lock arm comprises a locking segment proximate to the connection end and an unlocking segment away from the connection end, the elastic lock arm is positioned on the outer housing via a support structure and configured to be elastically deformed to raise the locking segment under an external force applied to the unlocking segment, and wherein the support structure comprises a plurality of legs, and each of the plurality of legs is connected to the elastic lock arm respectively.

17. The electrical connector according to claim 16, wherein the connector outer housing is one or a plug connector outer housing or a receptacle connector outer housing.

18. The electrical connector according to claim 16, wherein the connector outer housing is one of a cable-end connector outer housing or a board-end connector outer housing.

19. An electrical connection assembly comprising:

a mating connector; and an electrical connector comprising a connector outer housing and electrical connection terminal mounted therein, the connector housing comprising:

a tail end defining a first opening and a connection end defining a second opening, the first opening configured to be used for wire entrance and the second opening configured to form a connection relationship with a mating connector outer housing of the mating connector, wherein an elastic lock arm is provided on an operating surface of the outer housing, the elastic lock arm comprises a locking segment proximate to the connection end and an unlocking segment away from the connection end, the elastic lock arm is positioned on the outer housing via a support structure and configured to be elastically deformed to raise the locking segment under an external force applied to the unlocking segment, and the support structure comprises a plurality of legs, and each of the plurality of legs is connected to the elastic lock arm respectively.

* * * * *